(12) United States Patent
Lesage

(10) Patent No.: US 10,837,674 B2
(45) Date of Patent: Nov. 17, 2020

(54) SAFETY POWER CONNECTING SYSTEM AND METHOD FOR ELECTRIC WATER HEATERS

(71) Applicant: MICLAU-S.R.I. INC., Montreal East (CA)

(72) Inventor: Claude Lesage, Pointe Claire (CA)

(73) Assignee: MICLAU-S.R.I. INC., Montreal (CA)

( * ) Notice: Subject to any disclaimer, the term of this patent is extended or adjusted under 35 U.S.C. 154(b) by 489 days.

(21) Appl. No.: 15/330,404

(22) Filed: Sep. 16, 2016

(65) Prior Publication Data

US 2018/0080684 A1    Mar. 22, 2018

(51) Int. Cl.
*F24H 9/20* (2006.01)
*F24H 1/20* (2006.01)
*H05B 1/02* (2006.01)

(52) U.S. Cl.
CPC ............ *F24H 9/2021* (2013.01); *F24H 1/202* (2013.01); *H05B 1/0283* (2013.01)

(58) Field of Classification Search
None
See application file for complete search history.

(56) References Cited

U.S. PATENT DOCUMENTS

| | | | | |
|---|---|---|---|---|
| 6,861,621 B2* | 3/2005 | Ghent | .................. | F24H 9/2021 |
| | | | | 219/492 |
| 7,822,325 B2* | 10/2010 | Murphy | ................. | F24H 1/201 |
| | | | | 219/494 |
| 9,405,304 B2* | 8/2016 | Branecky | ............ | G05D 23/1923 |
| 9,837,820 B2* | 12/2017 | Santinato | ................. | H02J 3/008 |
| 9,933,184 B2* | 4/2018 | Lesage | .................. | F24H 1/0018 |
| 2010/0187219 A1* | 7/2010 | Besore | .................... | G06Q 50/06 |
| | | | | 219/494 |
| 2011/0123179 A1* | 5/2011 | Roetker | ............... | F24D 17/0031 |
| | | | | 392/441 |
| 2012/0118989 A1* | 5/2012 | Buescher | .............. | F24H 9/2021 |
| | | | | 237/8 A |
| 2013/0193221 A1* | 8/2013 | Buescher | .............. | F24H 9/2021 |
| | | | | 237/8 A |
| 2013/0200168 A1* | 8/2013 | Buescher | .............. | F24H 9/2021 |
| | | | | 237/8 A |
| 2013/0202277 A1* | 8/2013 | Roetker | .................. | F24H 1/202 |
| | | | | 392/441 |
| 2014/0037275 A1* | 2/2014 | Flohr | ........................ | H02J 3/14 |
| | | | | 392/464 |

(Continued)

*Primary Examiner* — Thor S Campbell
(74) *Attorney, Agent, or Firm* — Guy J. Houle; Houle Patent Agency Inc.

(57) ABSTRACT

A safety system and method to prevent water within a top portion of a tank of an electric water heater to drop below a safe temperature during a load shedding period, other than a full emergency grid failure, by a power provider whereby to prevent the propagation of harmful bacteria in a top portion the tank. A control device monitors the water temperature in the top portion of the tank by the use of a temperature sensor. If the control device detects a temperature of the water in the top portion of the tank inferior to 140 degrees F., it will by-pass the instructions of the power provider and connect power to one or more of the resistive heating elements of the tank until a predetermined temperature above 140 degrees F. is attained before switching off the resistive heating elements.

7 Claims, 2 Drawing Sheets

(56) References Cited

U.S. PATENT DOCUMENTS

2014/0105584 A1\* 4/2014 Flohr .................... F24H 9/2021
392/441
2015/0277463 A1\* 10/2015 Hazzard .............. F24D 19/1063
700/295

\* cited by examiner

SAFETY POWER CONNECTING SYSTEM AND METHOD FOR ELECTRIC WATER HEATERS

TECHNICAL FIELD

The present invention relates to a safety system for electric water heaters to ensure that the top portion of the tank maintains a water temperature sufficient to prevent the propagation of harmful bacteria within the water during load shedding periods by a utility or other accidental occurrences when power to the resistive heating elements of the water heater is shut off.

BACKGROUND OF THE INVENTION

There are several control systems designed to control an electric water heater by remotely setting the desired temperature of the hot water and/or controlling the operating times of operation whereby to heat water outside the peak hours were electricity is less expensive. Some of these control systems are known as "smart" control systems and it is now possible to access these smart control systems remotely. This is particularly of interest to energy providers which can have access to individual or groups of water heaters to shed some of the load from the grid during high demand time periods or for other reasons. Also, after an emergency full grid failure the load on the grid needs to be controlled whereby the load is progressively re-introduced in a controlled manner.

Several inconveniences to households occur when there is a power cut-off of appliances due to load shedding and particularly so when the appliance is a water heater. Usually, a power cut-off by a utility is unpredictable. Accordingly, a power cut-off could occur immediately after a large draw of hot water from the tank of the water heater, such as after the operation of a washing machine or the filling of a bathtub with hot water. Therefore, such a power cut-off occurrence could leave the water in the tank of the water heater at a very low temperature for an undetermined period of time. Such stagnant water when at temperatures below 140 degrees F. is ideal for the propagation of harmful bacteria such as the *legionella* bacteria. The *legionella* bacteria multiply where temperatures are between about 68-112 degrees F. and nutrients are available. The bacteria are dormant below 68 degrees F. and do not survive above 140 degrees F. Legionnaires's disease is a potentially fatal type of pneumonia, contracted by inhaling airborne water droplets containing viable *Legionella* bacteria.

Control devices are also becoming more complex to understand and operate and it is therefore prone to errors when making temperature adjustments to the thermostats or programming operations thereof. Such errors may result in improper setting of water temperature, improper setting of a pre-programmed clock and the heating cycles, and particularly so prior to a person leaving the household for long periods of time, such as when leaving for vacation, business trips, etc. There is also the risk that an improper setting of the control may cause the water heater to be accidently shut down. Such errors again results in the risk of bacteria propagation in the upper portion of the tank where the draw of hot water occurs and where water should be maintained at a temperature above 140 degrees F., at which temperature the bacteria cannot survive. If there is a draw of the water in the upper portion of the tank after the water has fallen below 140 degrees F., that water can be potentially hazardous to a person's health, as mentioned herein above.

SUMMARY OF THE INVENTION

It is therefore a feature of the present invention to provide a safety system for electric water heaters which overcomes the above mentioned disadvantages.

Another feature of the present invention is to provide a safety power switching system for electric water heaters which can override a remote voluntary shut down by a power provider to maintain the water in the upper portion of the tank at a safe temperature.

A further feature of the present invention is to provide a safety power switching system for electric water heaters which can detect a temperature drop in the upper portion of the tank and due to a malfunction of a control device and maintain the water temperature in the upper portion of the tank to a safe temperature.

A still further feature of the present invention is to provide a method of preventing water within a tank of an electric water heater to drop below a safe temperature, during a load shedding period by a power provider or during a malfunction of an electric water heater control device, to prevent the propagation of harmful bacteria in a top portion of the tank.

According to the above features, from a broad aspect, the present invention provides a safety system for connecting power to an electric water heater during a load shedding period by a power provider. The system comprises a control device to connect electrical power to the water heater. The control device has a programmed function for communication with said power provider through a communication link. A temperature sensor senses water temperature in an upper portion of a tank of the water heater and feeds temperature signals to the control device. The temperature signals are representative of water temperature in the upper portion of the tank. The control device communicates an information signal to the power provider, during the load shedding period, that the water heater will be connected to power, upon the control device detecting of a predetermined temperature signal from the sensor which is inferior to a desirable temperature the upper portion of the tank during the load shedding period.

According to another broad aspect of the present invention the safety system is a power switching system and wherein the control device operates a power switch to enable the uppermost resistive heating element of the water heater to maintain the temperature in the upper portion of the tank of the water heater at a desired predetermined temperature above 140 degrees F.

According to another broad aspect of the present invention there is provided a method of preventing water within a tank of an electric water heater to drop below a safe temperature, during a load shedding period, other than a full emergency grid failure, by a power provider whereby to prevent the propagation of harmful bacteria in a top portion of the tank. The method comprises the steps of:
i) continuously sensing water temperature in a top portion of the tank,
ii) feeding temperature signals to a control device by the sensor for detecting the temperature of water in the top portion of the tank,
iii) communicating a response signal to the power provider when the control device receives an information signal from the power provider to shut down the water heater for a shut down time period, the response signal communicating that the water heater will not shut down in an event when the temperature signal is inferior to a predetermined desired temperature in the top portion of the tank, and iv) automatically shutting down the water heater when the temperature signal attains the desired temperature during the shut down period.

According to a further broad aspect of the present invention the control device is a power switch control device and wherein the power switch control device activates a power switch to connect a power source to an uppermost resistive heating element of the electric water heater when the switch control device detects a temperature signal value from a temperature sensor indicating that the water within an upper portion of the tank of the water heater is inferior to a predetermined desired temperature value.

BRIEF DESCRIPTION OF THE DRAWINGS

A preferred embodiment of the present invention will now be described with reference to the examples thereof as illustrated by the accompanying drawings in which.

DESCRIPTION OF THE DRAWINGS

Figure 1:
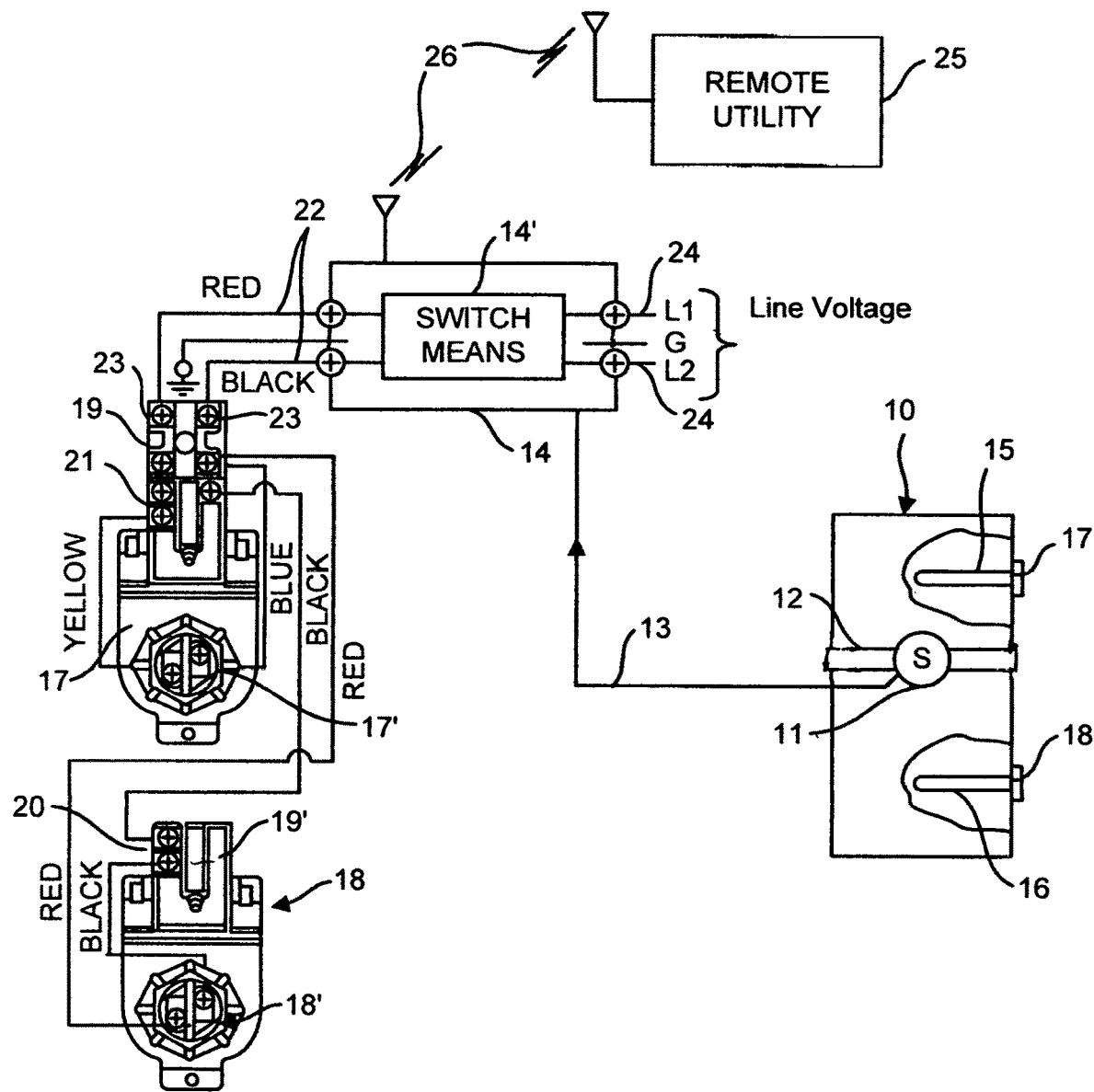
FIG. 1 is a block diagram illustrating a first example of the preferred embodiment of the safety system of the present invention wherein the control device is in communication with a remote power provider and is connected to a sensor secured to the tank to sense the water temperature inside the upper portion of the tank.

Referring now to the drawings and more particularly to FIG. 1, there is shown a two element electric water heater steel tank 10 to which is secured a temperature sensor 11 at mid to upper level of the tank to sense water temperature in the upper section of the tank. As herein shown, the temperature sensor 11 is secured by a strap harness 12 slightly above the mid level of the tank. The sensor 11 senses the temperature of the tank wall at that location and which temperature is representative of the temperature of water within the tank at that level. A communication link 13 provides temperature signals to a control device 14.

The two element water heater herein illustrated has a top resistive heating element 15 secured in a top section of the tank and a bottom resistive heating element 16 secured in a bottom section of the tank 10. A thermostat control bracket 17 and 18 is secured to the connecting flange 17' and 18' of the top and bottom resistive heating elements, respectively. To the top thermostat control bracket 17 there is secured a control 19 and a thermostat 21 which is used to sense the temperature of the tank wall at that location for the control to be set to operate the resistive heating elements within a set temperature range. Such is well known in the art. The top element control 19 is connected to a control 19' of the bottom element 18 to operate the bottom element. The elements are provided 220 ac line voltage through lines 22 connected to input terminals 23 of the control 19.

As herein shown the control device 14 is connected to the incoming supply lines 24 and has an internal switch means 14' to cut-off the supply to the control 19 to shut-off the resistive heating elements 15 and 16. The control device 14 is programmed to do so upon receiving an information signal from a remote power provider 25 through a communication link 26, herein a wireless link. However, with the present invention the control device 14 has a programmed function which continuously monitors the temperature signal from the sensor 11 through its connection 13 whereby upon receiving an information signal from the power provider that power will be cut-off for load shedding, the control device 14 will cut-off the power from the incoming supply lines 24 but only if the temperature signal from the sensor 11 indicates a temperature of more than 140 degrees F. If the temperature signal is below 140 degrees F., the control device 14 will send a signal to the power provider that it will maintain power to its resistive heating elements 15 and 16. However, upon the sensor 11 sensing a temperature above 140 degrees F., the control device 14 will switch off the line voltage to the elements. This on and off sequence of switching of the line voltage continues during the entire power shedding period. Alternatively, the switching off of the line voltage may be accomplished by the thermostat control upon reaching its set high temperature cut point where it will cut off the supply from its supply lines 22. As mentioned herein by maintaining the temperature in the upper section of the tank at a temperature above 140 degrees F., the *legionella* bacteria is killed. In the event of a total power failure on the grid this programmed function of the control device 14 is rendered inactive as there is no longer power on the incoming supply lines 24 to operate the elements. Also, the power provider overrides the control device 14 under a total power loss condition to directly control power to the household appliances in a controlled sequence not to overload the electrical grid. The water heaters are usually re-introduced to the grid by group categories.

Figure 2:
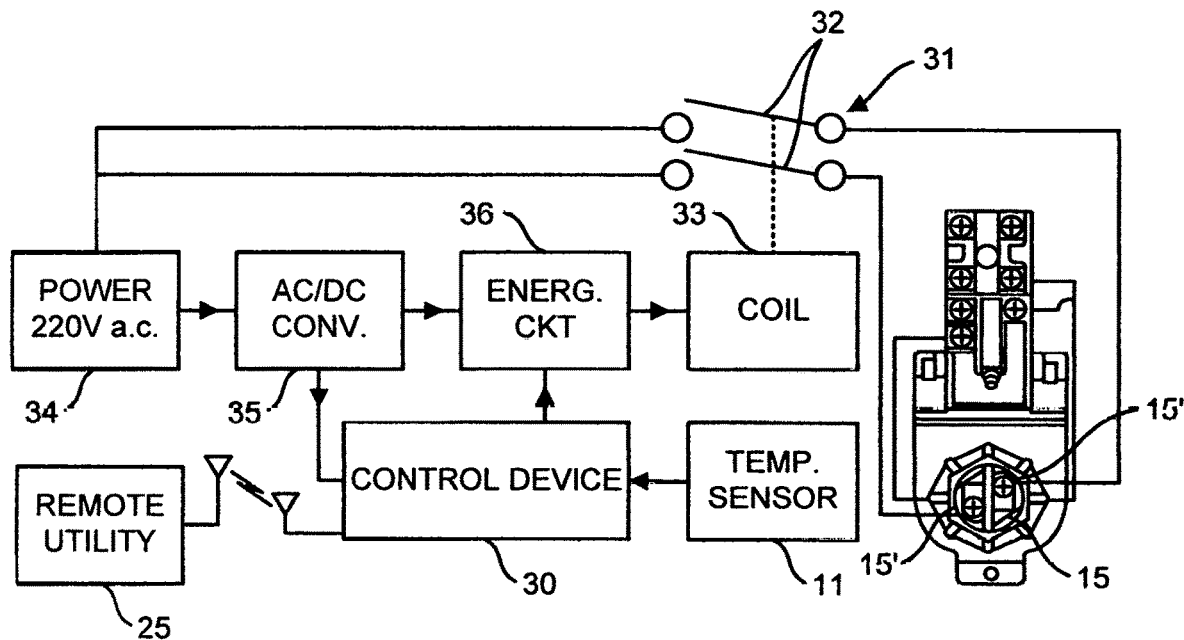
FIG. 2 is a block diagram illustrating a further example of the safety system of the present invention wherein a power switch is operated by the control device upon detection of water temperature in the upper portion of the tank being below a predetermined value and causd by a power disconnection from the water heater other than power cut-off by the power provider whereby to maintain the temperature of water inside the upper portion of the tank above a predetermined value.

Referring now to FIG. 2 there is shown another example of the safety system of the present invention. As herein illustrated the system is comprises of a safety switch control device 30 whose function is to operate a power switch 31, herein in the form of a relay having switch arms 32 operated by a coil 33 which is provided power from any immediate line voltage source 34. The safety switch control device 30 receives temperature signals from the temperature sensor 11 secured to the tank 10, as illustrated in FIG. 1.

As shown in FIG. 2, the switch 31 is connected to only the uppermost resistive heating element whereupon being closed by the safety switch control device it will operate only one of the resistive heating elements, herein the top element 15. The safety switch control device 30 in this configuration can detect any loss of power to the resistive heating elements that can be caused by other factors not related to the power provider and the grid. For example, if a smart control device is improperly programmed by a user person operating inputting switches or becomes defective for any reason and the power to the resistive heating element is switch off, as soon as the safety switch control device 30 detects a temperature signal inferior to 140 degrees F. it will cause the power source 34 to energize the coil 33 to engage the switch arms 32 of the relay and supply power from the source 34 to the connectors 15' of the resistive top heating element 15. As herein shown the coil 33 is energized by a d.c. voltage provided from the 220V ac source 34 through an AC/DC converter and an energy circuit 36 of a type well known in the art. The safety switch control device 30 is also programmed to de-energize the coil 33 to cut-off the supply to the resistive heating element 15 upon detection of a water temperature value above 140 degrees F.

Figure 3:
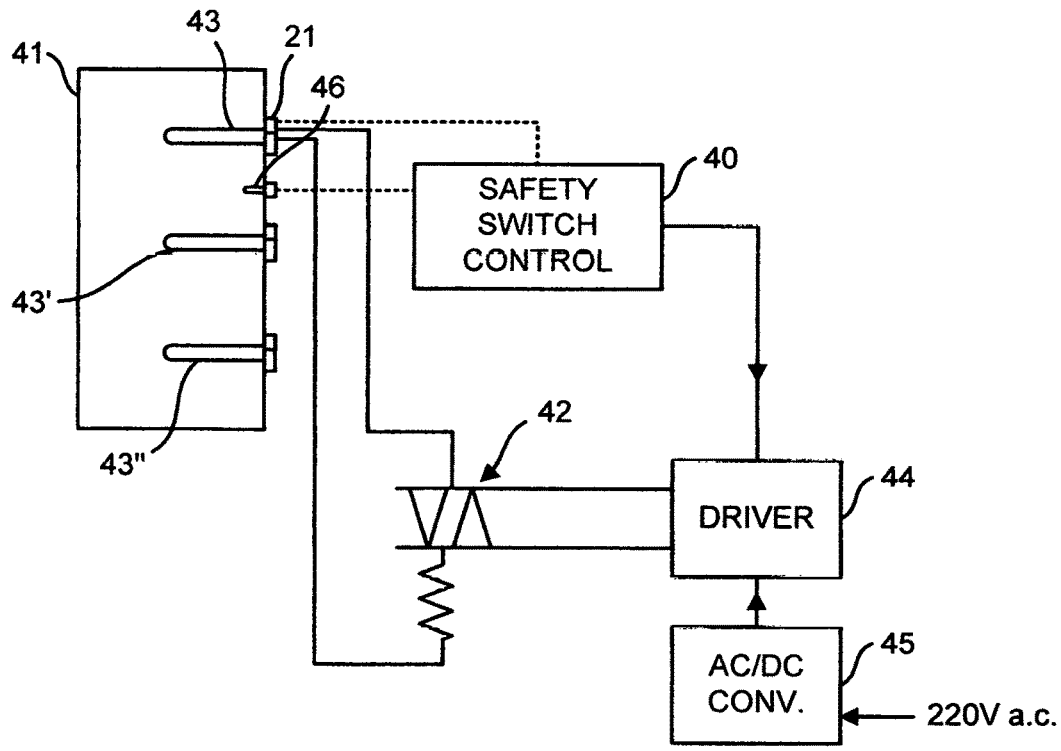
FIG. 3 is a block diagram illustrating a still further example of the safety system of the present invention wherein a triac power switch is operated by a switch control device and wherein the temperature sensor is that provided by the thermostat of an uppermost element of the electric water heater.

FIG. 3 illustrates a still further example of the safety system of the present invention. As herein illustrated, the safety switch control 40 utilizes the temperature sensor of the thermostat 21 of the uppermost resistive heating element 43 of a tank 41 of a three element electric water heater to detect the temperature of water within the tank in the upper section of the tank. The temperature sensor can also be a temperature probe 46 which extends within the tank above mid-section to feed temperature signals to the control device 40. The safety switch control 40 operates a triac power switching device 42, known in the art, to connect power to the uppermost resistive heating element 43 of the three element tank. Of course, the safety switch control 40 could operate any or all of the resistive heating elements 43, 43' and 43" of the tank 41, and this could be done through switches which may be operated is sequence through a timing circuit controlled by the control device 40. As shown, the triac is operated by a driver 44 which connects the d.c. supply from a converter 45 connected to a 220 Vac power source.

Briefly describing the operation of the present invention, it relates to a method of preventing water within a tank of an electric water heater to drop below a safe temperature of 140 degrees F. to prevent the propagation of the *legionella* bacteria in the upper portion of the tank of the water heater. Hot water is drawn from the upper portion of the tank and that water needs to be maintained above 140 degrees F. not to be infected and cause harmful disease to a user person. To achieve this, the method continuously senses the water temperature in the upper portion of the tank by the use of a temperature sensor secured against the tank outer wall in the mid-to-upper portion of the tank or a temperature probe. The temperature signals are linked to a control device which monitors the water temperature and which connects power from a power source to the upper and/or other resistive heating elements of the water heater to maintain the temperature in the upper section of the tank above 140 degrees F.

In the event where the utility sends an instruction signal to a control of a water heater that it is about to cut-off power to the water heater for load shedding, other than a full emergency situation, the control will send back an information signal to the utility that it will prevent the cut-off of its water heater but only if the temperature of water within the upper portion of the tank of the water heater is inferior to 140 degrees F. Also, during a power cut-off by the utility (power provider) during load shedding or by other means, the control device will connect power to one or more of the resistive heating elements of its water heater to maintain the temperature in the tank upper portion above 140 degrees F. By doing so, the propagation of harmful bacteria, such as the *legionella* bacteria is prevented and a constant supply of safe hot water is provided. Of course, in the event of a total power failure on the grid, the power provider has full control of the water heater and other power appliances to prevent overloading the grid upon power recovery.

It is within the ambit of the present invention to cover any obvious modifications of the examples of the preferred embodiment described herein, provided such modifications fall within the scope of the appended claims.

The invention claimed is:

1. A safety power switching system for connecting power to an electric water heater before or during a load shedding period by a power provider to prevent water within a tank of said water heater to drop below a safe temperature during said load shedding period, other than a full emergency grid failure by a power provider whereby to prevent the propagation of harmful bacteria in a top portion of said tank, said system comprising a control device to connect electrical power to said water heater through a power switch connected to a power supply line, said control device having a programmed function for communication with said power provider through a communication link, a temperature sensor secured to an outer surface of said tank in a mid-to-top section of said tank for sensing water temperature in an upper portion of a said tank of said water heater and feeding temperature signals to said control device representative of water temperature in said upper portion of said tank; said control device communicating an information signal to said power provider, during said load shedding period, that said water heater will be connected to power upon said control device detecting a predetermined temperature signal value of about 140 degrees F. from said sensor which is inferior to a desirable temperature in said upper portion of said tank during said load shedding period, said power switch being enabled by said control device during one of said load shedding period and a prolonged power cut-off due to a malfunction of an associated smart control device causing water within said tank upper portion to drop in temperature below said predetermined temperature, said control device being a smart control device operating said water heater and having inputting means accessible to a user person, said communication link being established through said smart control device which is in communication with said power provider, said smart control device operating said power switch to close during power failure occurrences other than by said power provider.

2. The safety system as claimed in claim 1 wherein said power from said power switch is disconnected from said uppermost resistive heating element by a pre-set high temperature setting of a thermostat control associated with said uppermost resistive heating element.

3. The safety power switching system as claimed in claim 1 wherein said communication link being is established through said smart control device which is in communication with said power provider.

4. The safety system as claimed in claim 1 wherein said electric water heater has two or three of said resistive heating elements secured respectively in an upper, middle and lower portion of said tank.

5. The safety system as claimed in claim 1 wherein said temperature sensor is secured for direct contact with said outer surface of said tank by a strapping harness.

6. The safety power switching system as claimed in claim 1 wherein said power switch is a triac switch.

7. The safety system as claimed in claim 1 wherein said power switch is a relay switch.

* * * * *